US012519255B2

(12) United States Patent
Lin

(10) Patent No.: US 12,519,255 B2
(45) Date of Patent: Jan. 6, 2026

(54) SIGNAL LINE COAXIAL CONNECTOR

(71) Applicant: HUANG LIANG TECHNOLOGIES CO., LTD., Kaohsiung (TW)

(72) Inventor: Kuo-Tung Lin, Kaohsiung (TW)

(73) Assignee: HUANG LIANG TECHNOLOGIES CO., LTD., Kaohsiung (TW)

(*) Notice: Subject to any disclaimer, the term of this patent is extended or adjusted under 35 U.S.C. 154(b) by 296 days.

(21) Appl. No.: 18/367,988

(22) Filed: Sep. 13, 2023

(65) Prior Publication Data

US 2025/0087913 A1 Mar. 13, 2025

(51) Int. Cl.
*H01R 9/05* (2006.01)
*H01R 13/24* (2006.01)

(52) U.S. Cl.
CPC ......... *H01R 9/0524* (2013.01); *H01R 9/0521* (2013.01); *H01R 13/2464* (2013.01)

(58) Field of Classification Search
CPC . H01R 9/0524; H01R 9/0521; H01R 13/2464
USPC ........................................................ 439/578
See application file for complete search history.

(56) References Cited

U.S. PATENT DOCUMENTS 4,305,638 A * 12/1981 Hutter .................. H01R 9/0521 439/583
6,530,807 B2 * 3/2003 Rodrigues .............. H01R 24/38 439/585
2003/0186583 A1 * 10/2003 Yeh ...................... H01R 9/0518 439/585

* cited by examiner

*Primary Examiner* — Tulsidas C Patel
*Assistant Examiner* — Thaslimur Rahman
(74) *Attorney, Agent, or Firm* — Che-Yang Chen

(57) ABSTRACT

The present invention provides a signal line coaxial connector, which includes a first connecting cylinder having a first inner flange arranged thereon; a signal line module coaxially inserted into the first connecting cylinder, wherein the signal line module has a first outer flange and a second outer flange, wherein the first outer flange abuts against the first inner flange of the first connecting cylinder, wherein the second outer flange is spaced apart from the first outer flange in a direction away from the first inner flange; and a second connecting cylinder detachably connected with the first connecting cylinder and abutting against the signal line module. In this way, the first connecting cylinder and the second connecting cylinder are detachably fixed to each other, and the signal line module is fixed therebetween, thereby achieving the effect of facilitating the replacement of the signal line module (signal line).

1 Claim, 6 Drawing Sheets

SIGNAL LINE COAXIAL CONNECTOR

BACKGROUND OF THE PRESENT INVENTION

Field of Invention

The present invention relates to a signal line coaxial connector, in particular to a replaceable and cost-saving signal line connector.

Description of Related Arts

Whether it is a computer, notebook computer, tablet computer or other related video equipment, signal cable connectors are required for signal transmission.

The conventional signal line connector that is common at this stage is composed of a metal body and a signal line. One end of the metal body is provided with a threaded portion, and the other end is provided with an extension section. A gasket is provided inside the extension section as an insulation barrier. The extension is embedded in a hollow circular metal sleeve. In addition, the signal line includes a wire core made of metal, which is used to transmit signals of one polarity (positive or negative). The wire core is covered with an insulating layer. The insulating layer is covered with a metal layer made of braided metal wires. The metal layer is used to transmit signals of the other polarity (negative or positive), and a non-conductive protective tube is placed outside the metal layer.

In addition, referring to Taiwan Patent Publication No. M548912, it discloses a signal line connector. The convex hole of the inner sleeve of the body is filled with tin solder, and the tin solder enhances the tensile strength of the signal line. When the connecting end of the signal line is inserted into the extension section of the body and pressed, the fixing part of the body covers the joint part of the sleeve so that the signal line is tightly fixed inside the extension section. The technical means of pouring tin solder into the convex hole can improve the problem that the signal line is easy to fall off due to pulling.

However, although it has the advantages and characteristics that it is not easy to fall off, the signal line has a problem of service life and needs to be replaced, because the inside of the convex hole is filled with tin solder and it cannot be replaced, resulting in high cost.

SUMMARY OF THE PRESENT INVENTION

In view of the foregoing problems, the present invention has been intensively researched and developed. Therefore, the main purpose of the present invention is to provide a signal line coaxial connector, which is detachably fixed to each other through the first connecting cylinder and the second connecting cylinder, such as screwing, so as to fix the signal line module therebetween, thereby achieving the effect of facilitating the replacement of the signal line module (signal line). Furthermore, since the screw connection between the first connecting cylinder and the second connecting cylinder is used for fixing, which has the advantages of simplified structure, simple operation and cost saving.

In order to achieve the above purpose, the present invention provides a signal line coaxial connector, which includes a first connecting cylinder having a first inner flange arranged thereon, wherein the first inner flange has a central through hole; a signal line module coaxially inserted into the first connecting cylinder, wherein the signal line module has a first outer flange and a second outer flange, wherein the first outer flange abuts against the first inner flange of the first connecting cylinder, wherein the second outer flange is spaced apart from the first outer flange in a direction away from the first inner flange, wherein the signal line module has a wire core contact pad, a block body and a signal line, wherein the signal line penetrates the block body from one end of the block body and is connected with the wire core contact pad at the other end of the block body, wherein the signal line has a wire core, wherein the wire core is also inserted into the wire core contact pad, wherein the wire core contact pad is inserted into the central through hole of the first connecting cylinder and passes through the central through hole to be electrically connected with the first connecting cylinder, wherein the wire core contact pad has a conductive through hole, wherein the signal line is electrically connected with the first connecting cylinder through the conductive through hole; and a second connecting cylinder detachably connected with the first connecting cylinder and abutting against the signal line module.

In some embodiments, the second connecting cylinder is partially connected in the first connecting cylinder.

In some embodiments, the second connecting cylinder has a third outer flange arranged thereon, wherein one end of the second connecting cylinder in the first connecting cylinder abuts against the second outer flange of the signal line module, wherein the third outer flange abuts against the outside of one end of the first connecting cylinder.

In some embodiments, the end of the second connecting cylinder that abuts the second outer flange of the signal line module has a first external thread portion arranged thereon, wherein the end of the first connecting cylinder abuts the third outer flange has a first internal thread portion arranged thereon, wherein the second connecting cylinder is detachably connected with the first internal thread portion of the first connecting cylinder through the first external thread portion.

In some embodiments, the second connecting cylinder has an extending cylinder section extending in a direction away from the first external thread portion.

In some embodiments, a fourth outer flange is arranged at a distance from the third outer flange on the extending cylinder section.

In some embodiments, the second connecting cylinder is connected with the outside of the first connecting cylinder.

In some embodiments, the second connecting cylinder has a second inner flange arranged thereon, wherein the second inner flange is located outside one end of the first connecting cylinder and abuts against the second outer flange of the signal line module.

In some embodiments, the second connecting cylinder has a second internal thread portion arranged at the connection point with the first connecting cylinder, wherein the first connecting cylinder has a second external thread portion arranged at the connection point with the second connecting cylinder, wherein the second connecting cylinder is detachably connected with the second external thread portion of the first connecting cylinder through the second internal thread portion.

DETAILED DESCRIPTION OF THE PREFERRED EMBODIMENT

The technical means by which the present invention achieves the above objectives are described in detail below with the following examples and figures, so that those skilled in the art can have a thorough understanding and recognition.

Figure 1:
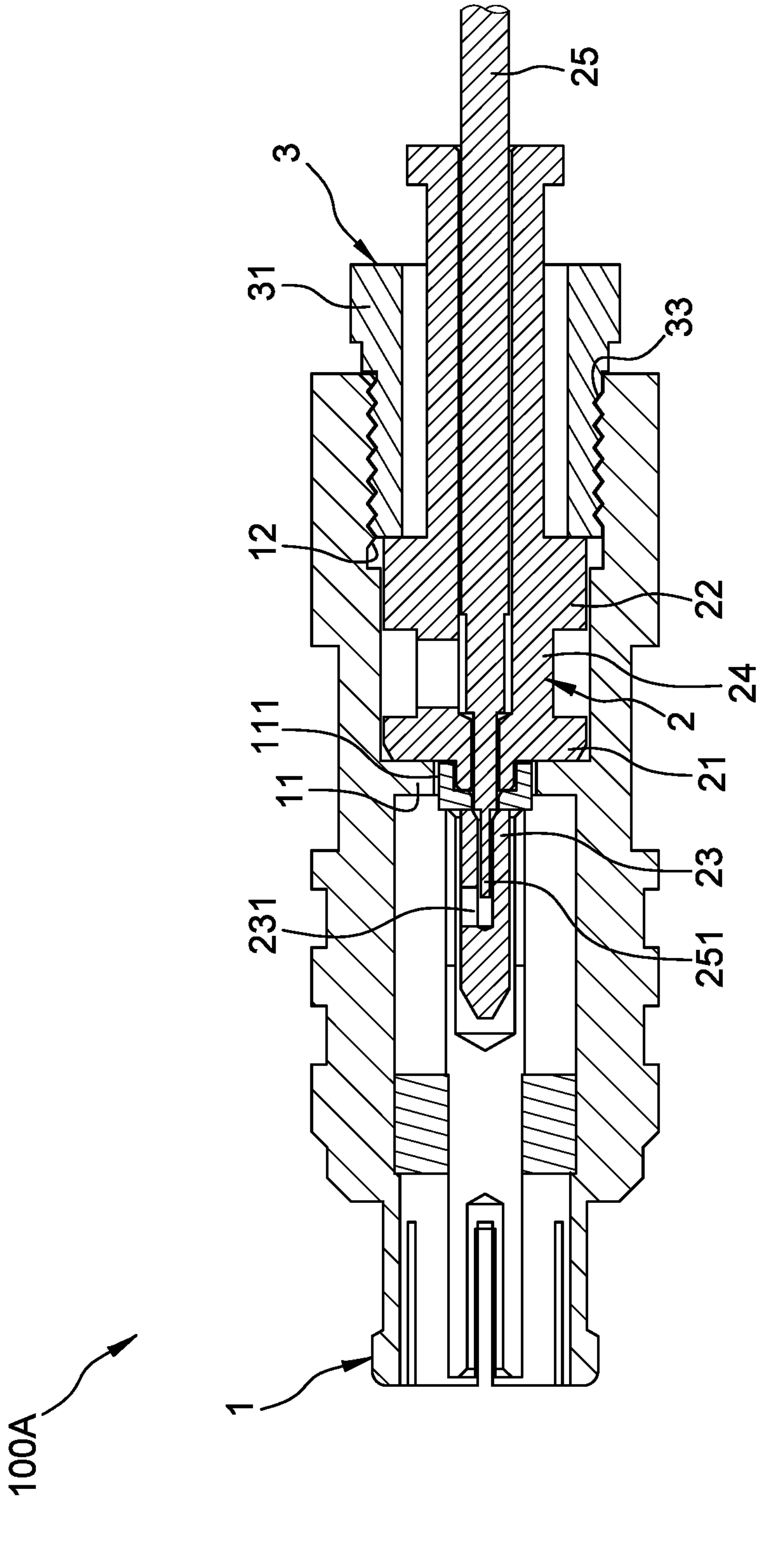
FIG. 1 is a sectional view of a first embodiment of a signal line coaxial connector according to the present invention.
Figure 2:
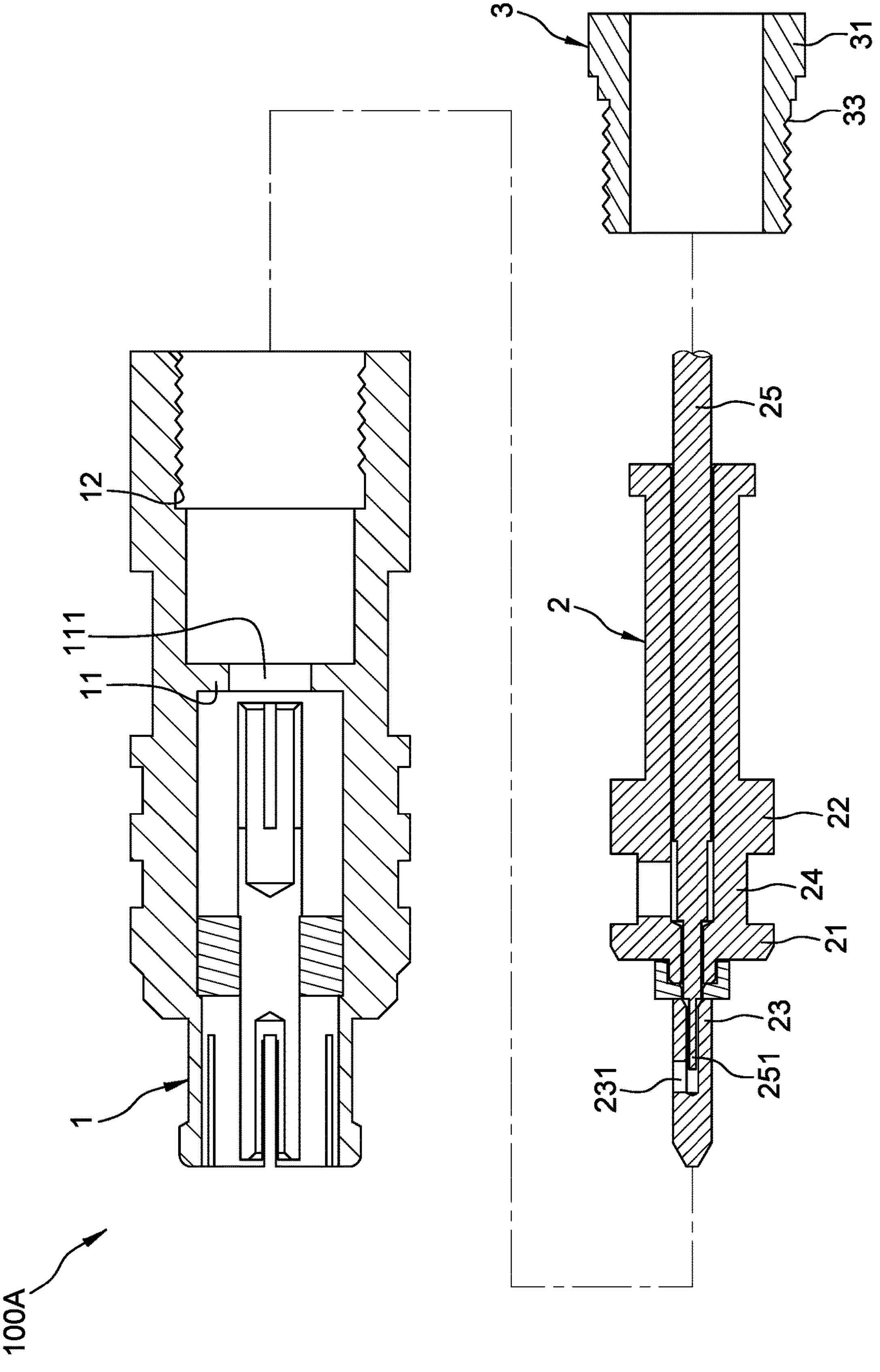
FIG. 2 is a sectional exploded view of the first embodiment of the signal line coaxial connector according to the present invention.

FIG. 1 is a sectional view of a first embodiment of a signal line coaxial connector according to the present invention. FIG. 2 is a sectional exploded view of the first embodiment of the signal line coaxial connector according to the present invention.

Referring to FIG. 1 to FIG. 2, the signal line coaxial connector 100A of the first embodiment of the present invention includes a first connecting cylinder 1, a signal line module 2 and a second connecting cylinder 3 respectively arranged thereon.

The first connecting cylinder 1 may have a first inner flange 11 arranged thereon. The first inner flange 11 is roughly ring-shaped and has a central through hole 111.

The signal line module 2 can be coaxially inserted into the first connecting cylinder 1. The signal line module 2 has a first outer flange 21 and a second outer flange 22 respectively arranged thereon. The first outer flange 21 abuts against the first inner flange 11 of the first connecting cylinder 1, and the second outer flange 22 is spaced apart from the first outer flange 21 in a direction away from the first inner flange 11.

The second connecting cylinder 3 is detachably connected with the first connecting cylinder 1, and pushes against the signal line module 2. In this first embodiment, as shown in FIGS. 1 to 2, the second connecting cylinder 3 is partially connected within the first connecting cylinder 1. In some embodiments, the second connecting cylinder 3 has a third outer flange 31. One end of the second connecting cylinder 3 inside the first connecting cylinder 1 abuts the second outer flange 22 of the signal line module 2, and the third outer flange 31 abuts the outside of one end of the first connecting cylinder 1.

In this first embodiment, the end of the second connecting cylinder 3 that abuts the second outer flange 22 of the signal line module 2 has a first external thread portion 33, and the end of the first connecting cylinder 1 abuts the third outer flange 31 has a first internal thread portion 12. Therefore, the second connecting cylinder 3 can be detachably connected with the first internal thread portion 12 of the first connecting cylinder 1 through the first external thread portion 33.

In some embodiments, the signal line module 2 has a wire core contact pad 23, a block body 24 and a signal line 25 respectively arranged thereon. The signal line 25 penetrates the block body 24 from one end of the block body 24 and is connected with the wire core contact pad 23 at the other end of the block body 24. The signal line 25 has a wire core 251, that is, the wire core 251 of the signal line 25 is also inserted into the wire core contact pad 23. In addition, the wire core contact pad 23 can be inserted into the central through hole 111 of the first connecting cylinder 1 and passes through the central through hole 111 to be electrically connected with the first connecting cylinder 1. In some embodiments, the wire core contact pad 23 is generally T-shaped, but is not limited to this. In some embodiments, the wire core contact pad 23 has a conductive through hole 231, wherein the signal line 25 is electrically connected with the first connecting cylinder 1 through the conductive through hole 231.

Figure 3:
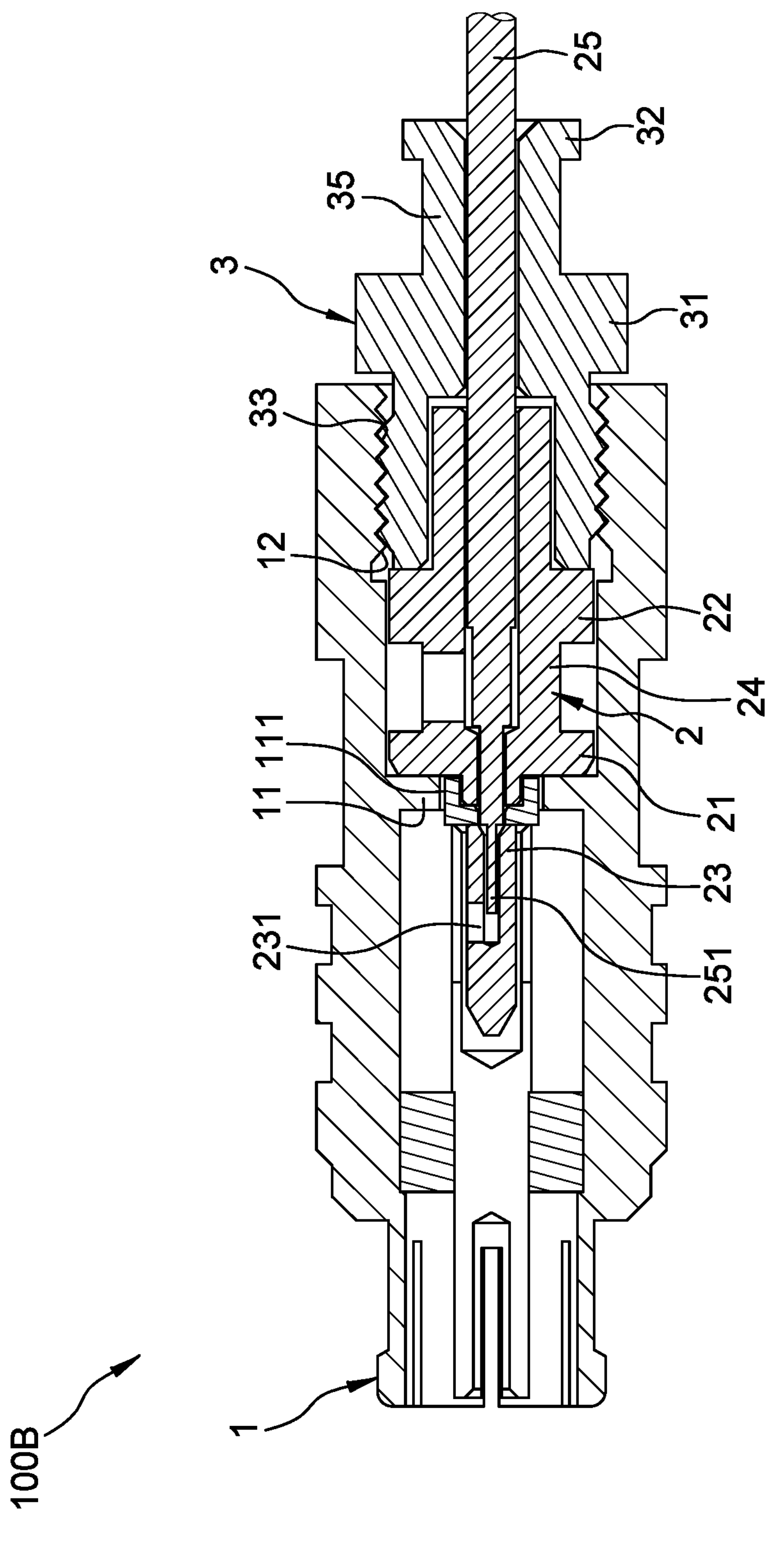
FIG. 3 is a sectional view of a second embodiment of a signal line coaxial connector according to the present invention.
Figure 4:
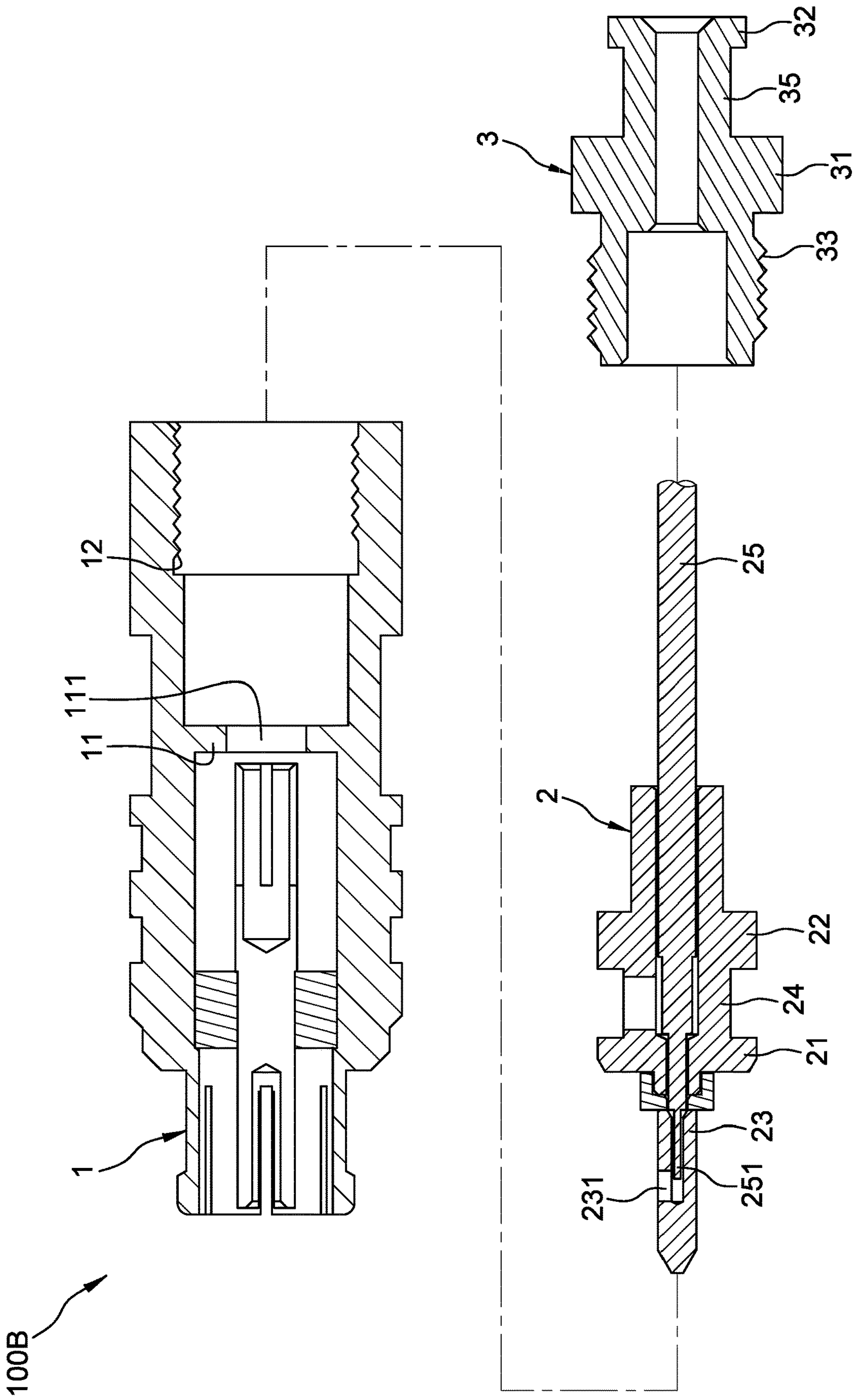
FIG. 4 is a sectional exploded view of the second embodiment of the signal line coaxial connector according to the present invention.

FIG. 3 is a sectional view of a second embodiment of a signal line coaxial connector according to the present invention. FIG. 4 is a sectional exploded view of the second embodiment of the signal line coaxial connector according to the present invention.

Referring to FIG. 3 to FIG. 4, the structure of the signal line coaxial connector 100B of the second embodiment of the present invention is similar to the signal line coaxial connector 100A of the aforementioned first embodiment. The difference is that the second connecting cylinder 3 of the signal line coaxial connector 100B of the second embodiment also has an extending cylinder section 35 extending in a direction away from the first external thread portion 33. Furthermore, in some embodiments, the extending cylinder section 35 has a fourth outer flange 32 spaced away from the third outer flange 31, so as to facilitate the connection of other components.

Figure 5:
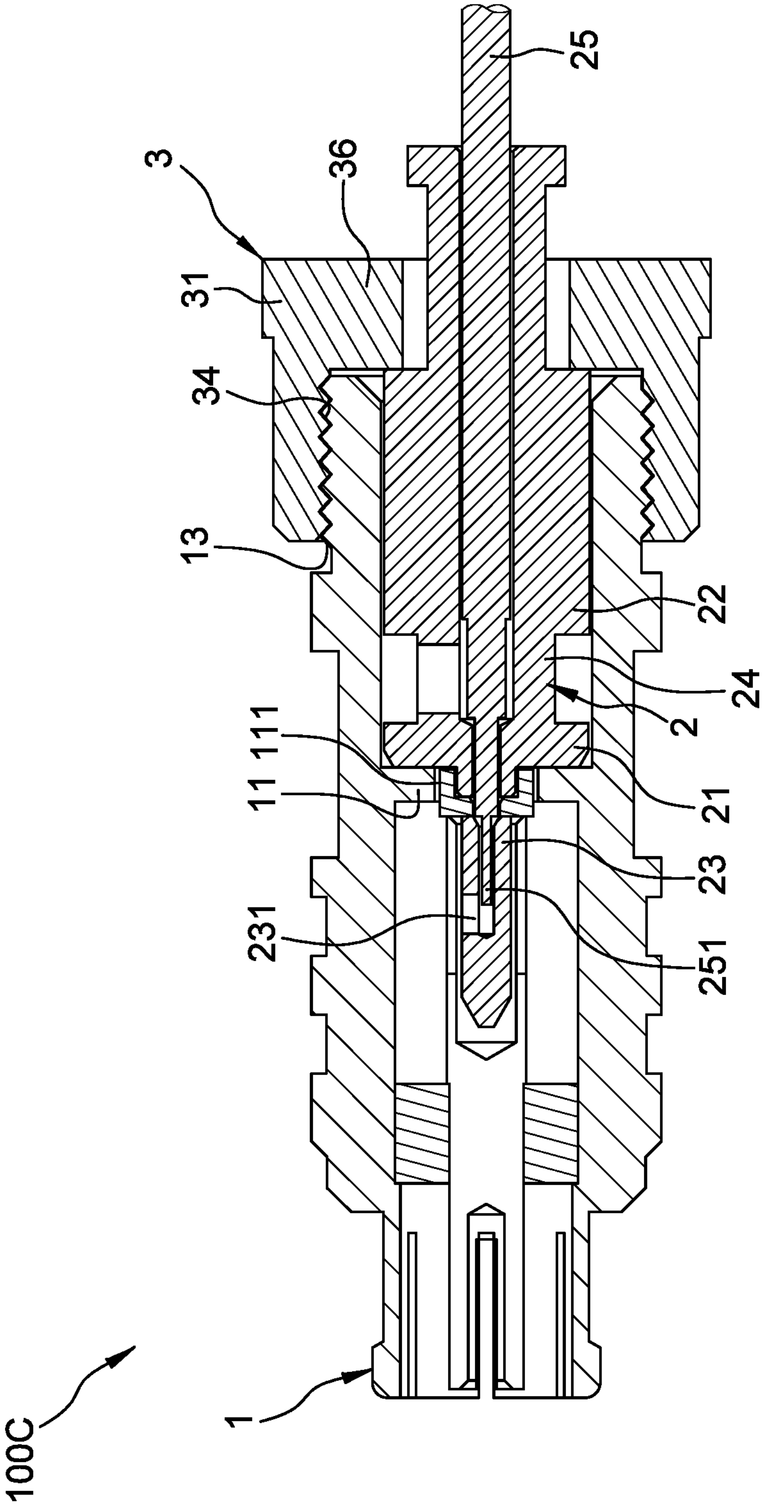
FIG. 5 is a sectional view of a thirdly embodiment of a signal line coaxial connector according to the present invention.
Figure 6:
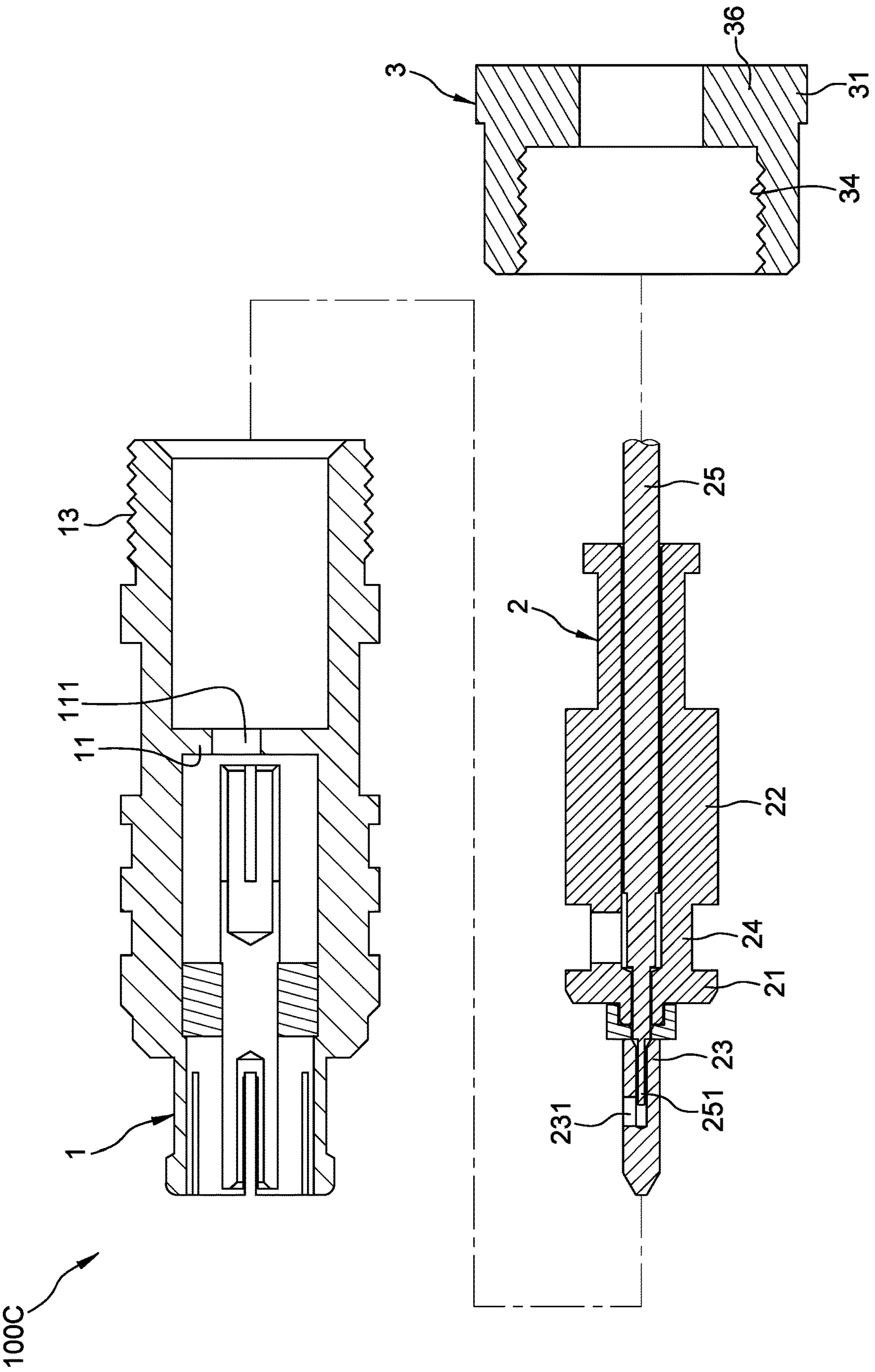
FIG. 6 is a sectional exploded view of the thirdly embodiment of the signal line coaxial connector according to the present invention.

FIG. 5 is a sectional view of a thirdly embodiment of a signal line coaxial connector according to the present invention. FIG. 6 is a sectional exploded view of the thirdly embodiment of the signal line coaxial connector according to the present invention.

Referring to FIGS. 5 and 6, the structure of the signal line coaxial connector 100C of the third embodiment of the present invention is similar to the signal line coaxial connector 100A of the first embodiment. The difference is that the second connecting cylinder 3 is connected with the outside of the first connecting cylinder 1. In the third embodiment, the second connecting cylinder 3 has a second inner flange 36. The second inner flange 36 is located outside one end of the first connecting cylinder 1 and abuts against the second outer flange 22 of the signal line module 2. Furthermore, the second connecting cylinder 3 has a second internal thread portion 34 at the connection point with the first connecting cylinder 1, and the first connecting cylinder 1 has a second external thread portion 13 at the connection point with the second connecting cylinder 3. Therefore, the second connecting cylinder 3 is detachably connected with the second external thread portion 13 of the first connecting cylinder 1 through the second internal thread portion 34.

In summary, the signal line coaxial connector 100A, 100B, and 100C of the present invention can be detachably fixed to each other through the first connecting cylinder 1 and the second connecting cylinder 3, such as screwing, so as to fix the signal line module 2 therebetween, thereby achieving the effect of facilitating the replacement of the signal line module 2 (signal line 25). Furthermore, due to the use of the screw connection between the first connecting cylinder 1 and the second connecting cylinder 3, which has the advantages of simplified structure, simple operation and cost saving.

What is claimed is:

1. A signal line coaxial connector, comprising:

a first connecting cylinder, having a first inner flange arranged thereon, wherein the first inner flange has a central through hole;

a signal line module, coaxially inserted into the first connecting cylinder, wherein the signal line module has a first outer flange and a second outer flange, wherein the first outer flange abuts against the first inner flange of the first connecting cylinder, wherein the second outer flange is spaced apart from the first outer flange in a direction away from the first inner flange, wherein the signal line module has a wire core contact pad, a block body and a signal line, wherein the signal line penetrates the block body from one end of the block body and is connected with the wire core contact pad at the other end of the block body, wherein the signal line has a wire core, wherein the wire core is also inserted into the wire core contact pad, wherein the wire core contact pad is inserted into the central through hole of the first connecting cylinder and passes through the central through hole to be electrically connected with the first connecting cylinder, wherein the wire core contact pad has a conductive through hole, wherein the signal line is electrically connected with the first connecting cylinder through the conductive through hole; and a second connecting cylinder, detachably connected with the first connecting cylinder and abutting against the signal line module, wherein the second connecting cylinder is partially connected in the first connecting cylinder, wherein the second connecting cylinder has a third outer flange arranged thereon, wherein one end of the second connecting cylinder in the first connecting cylinder abuts against the second outer flange of the signal line module, wherein the third outer flange abuts against the outside of one end of the first connecting cylinder, wherein the end of the second connecting cylinder that abuts the second outer flange of the signal line module has a first external thread portion arranged thereon, wherein the end of the first connecting cylinder abuts the third outer flange has a first internal thread portion arranged thereon, wherein the second connecting cylinder is detachably connected with the first internal thread portion of the first connecting cylinder through the first external thread portion, wherein the second connecting cylinder has an extending cylinder section extending in a direction away from the first external thread portion, wherein a fourth outer flange is arranged at a distance from the third outer flange on the extending cylinder section.

* * * * *